Figure 1:
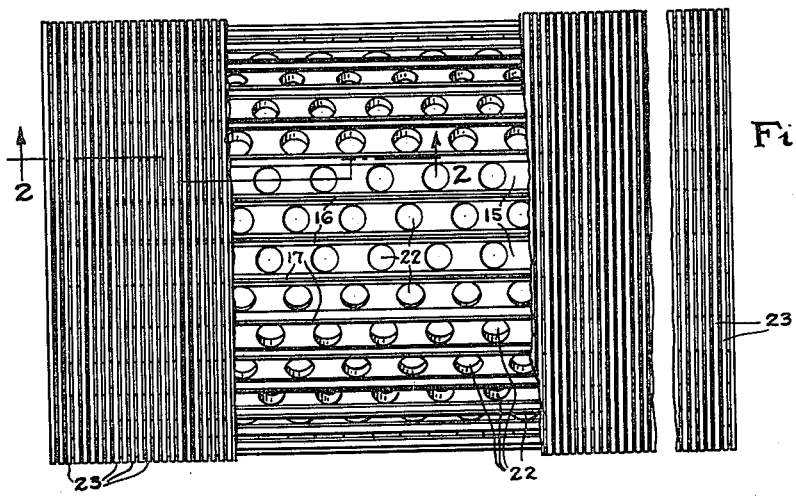

July 7, 1936.  E. E. JOHNSON  2,046,459
SCREEN FOR OIL WELLS
Filed April 2, 1935

Inventor:
Edward E. Johnson
By Whiteley and Ruckman
Attorneys

Patented July 7, 1936

2,046,459

UNITED STATES PATENT OFFICE 2,046,459

SCREEN FOR OIL WELLS

Edward E. Johnson, St. Paul, Minn., assignor to Edward E. Johnson, Incorporated, St. Paul, Minn.

Application April 2, 1935, Serial No. 14,233

10 Claims. (Cl. 166—3)

My invention relates to a screen for use in connection with oil-wells, and has for its object to provide such a screen which is not only particularly strong and able to resist intense stresses in the sinking of such a screen in very deep oil-wells, but which will have a very large screening capacity, and will be substantially self-cleaning, and hence which cannot clog or have its screening capacity seriously diminished.

In the matter of securing crude oil from pools in the ground, it has come more and more to be the practice to go to very great depths. In recent years frequently oil-wells are sunk more than a mile down. It is, therefore, highly essential that the screen employed to admit the crude oil into the pipe up which it may flow, either under its own pressure or forced up by pumps, shall be strong enough to resist heavy stresses. Ordinary well screens, therefore, are not adapted to this use. At the same time, owing to the great depth to which the screens have to be sunk, it is also of the highest importance to have a screen with relatively large capacity and one which will not quickly fill with the sand or other material where the oil is found and become clogged. Various efforts to obtain an oil-well screen of sufficient strength and of some degree of screening capacity have been made from time to time. All of these involve the use of heavy tubing with spaced perforations or holes in its, and some form of protective means above these holes to keep out the loose material of the oil-bearing strata. These devices, where made sufficiently strong to withstand the stresses to which they are subjected, have had very limited screening capacity. A still more serious defect has been that they fill with the loose material of the oil-bearing strata and become clogged quite rapidly. This results in rapid diminishing of capacity, and ultimately in substantially blocking the screen and ending its useful life. In very deep oil-wells this is an extremely serious matter, for the expense of withdrawing a screen and resetting it is necessarily very great. Yet, where the diminished flow of oil in comparison with the flow in adjacent wells with newer screens indicates that the oil pool still contains large reserves, there is no way of remedying the difficulty except by the highly expensive and precarious operation of withdrawing the oil screen for cleaning, and resetting the same.

It is the principal object of my invention to provide a screen for oil-wells which will possess entirely adequate strength, and will none the less have a relatively large screening capacity, and which will be highly efficient in the matter of elimination of clogging material, so that its useful life will continue as long as there is a supply of oil in the pool which may profitably be withdrawn, and so it will not be necessary to pull up and reset the screen.

It is an object of my invention to provide an oil-well screen wherein a body tube is provided of thickness greater than that necessary in itself to provide the adequate strength, and which has formed thereon a multiplicity of flat-bottomed longitudinally-extended valleys with intervening V-shaped ribs integral with the metal of the tube and having a multiplicity of rows of holes extending through the tube along the bottom walls of said valleys. Upon the outer narrow edges of the V-shaped ribs is helically wound a wire, also V-shaped in cross-section with its small edge in contact with the small edge of the ribs and fused and integrated with said ribs at every crossing point of ribs and wire. There is thus formed on the outside of the oil-well screen a layer of the coiled wire which is integrally united with the ribs and which has the adjacent wire edges everywhere spaced apart uniform distances to provide a continuous drainage slot into the valley spaces between the ribs. This outer layer of wire creates in effect a cell structure forming an integral part of the ribs and tube and cannot be deformed or displaced under the heavy stresses to which the oil-well screen will be subjected. The drainage slots are narrowest at their outsides and are inwardly-expanded into the valley spaces. There is also adequate space between the bottoms of the slots and the floor walls of the valleys through which the openings extend to the inside of the screen. All holes to the interior open directly and wholly through the bottoms of the valleys. This arrangement provides an oil-well screen having very large capacity and which is self-cleaning, since any particle which can possibly pass through the drainage slots is fully released into ample free spaces to pass into the pipe and out with the oil. This arrangement of slots and spaces and holes will permit development in the oil-bearing sands as is done with well screens in water-bearing sands. That is, smaller particles of the strata around the oil-well screen and for a considerable distance away from it will move to and pass through the screen. At the same time the larger particles will arrange themselves back from the oil-well screen so as to permit ready movement and flow of oil therethrough and to and into the oil-well screen.

The full objects and advantages of my invention will appear in connection with the detailed description thereof now given, and the novel features of the invention are particularly pointed out in the appended claims.

In the drawing, illustrating my novel oil-well screen,—

Figure 2:
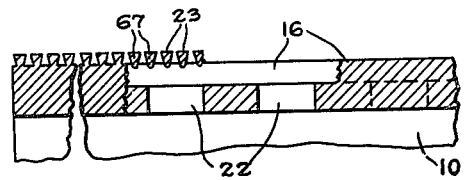
Figure 6:
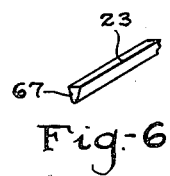
Figure 3:
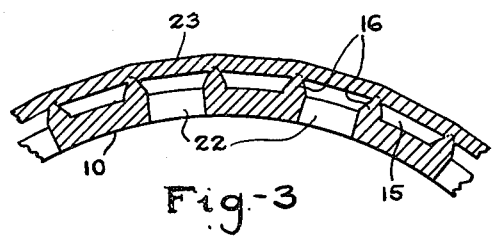
Figure 5:
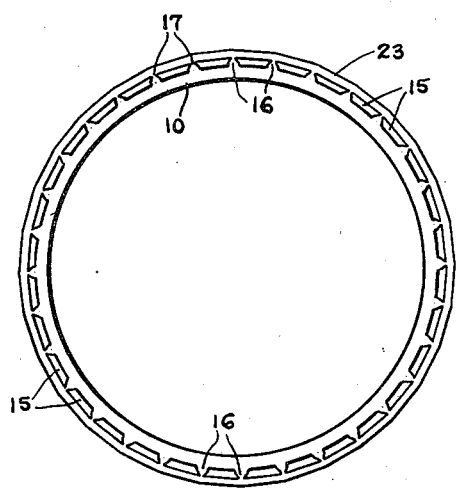
Figure 4:
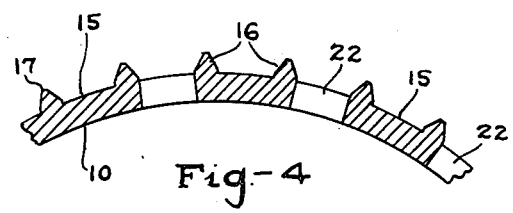

Fig. 1 is a plan view of an oil-well screen with some parts broken away illustrating the various features of the oil-well screen above defined. Fig. 2 is a partial enlarged section on line 2—2 of Fig. 1. Fig. 3 is an enlarged section of a portion of the oil-well screen taken through an arc of one of the coils of the helical wire. Fig. 4 is an enlarged section similar to Fig. 3 taken between coils of the helical wire. Fig. 5 is an end view of the completed oil-well screen. Fig. 6 is a perspective view of the helical wrapping wire.

As indicated in Figs. 1 and 3, a heavy walled tube 10 has milled or otherwise formed therein a multiplicity of valleys 15 separated by longitudinal ribs 16 formed of the metal of the tube and spaced apart uniform distances by the valleys 15. The side walls of the valleys 15 diverge so that the ribs 16 come to a substantially acute-angled edge indicated at 17 in Figs. 4 and 5. The outer edges 17 of the ribs 16 are formed and shaped to lie in a common cylindrical surface. Along the bottoms of the valleys 15 are punched a multiplicity of holes 22 opening from the inside of cylinder 10 to the bottoms of the valleys 15, as clearly shown in Figs. 1, 3 and 4.

Upon the outer edges 17 of the ribs 16, so lying in a common cylindrical plane is helically wound a wire 23 having a cross-sectional shape indicated at 67 in Figs. 2 and 6, this cross-section being wedge-shaped with a flat outer surface and a substantially acute-angled edge contacting the acute-angled edges 17 of the ribs 16. The helical coils of the wire are everywhere spaced the same distances apart, and are welded to and sunk at the contacting acute-angled edges respectively uniform and equal predetermined distances into the edges of the ribs 16 and welded thereto at every crossing point, whereby is produced a cylindrical screen surface formed with a continuous helical slot or helical slot coils of uniform width and substantially unblocked by the welded union between the reduced edge portions of the helical wire 23 and the supporting ribs 16.

The above construction provides an extraordinarily strong screen device, cellular in character, capable of resisting the terrific strains to which the screen is subjected in being placed in position at the bottom of deep oil-wells. At the same time the drainage slots widening inwardly into the valleys or channels 15 and not materially blocked by the supporting ribs to which the helical wire is welded gives a screen surface not only of relatively very high capacity, but also one which is substantially self-cleaning, and, hence, is capable of long-time service without becoming clogged so as to reduce its capacity or render it any degree inoperative.

The multiplicity of longitudinal channels of substantial width and depth along the outside of the tube and under the drainage wrapping consisting of the multiplicity of helical coils of the wire communicates through the numerous holes at the bottom of each channel with the interior of the tube, and produces an oil-well screen of very large capacity and self-cleaning drainage slots, and at the same time one of extraordinary strength in proportion to the weight of metal used, since the longitudinal ribs metallically integrated with the helical wrappings more than compensate for the loss of metal in the tube through the formation of longitudinal valleys and the punching of holes in the bottom thereof relatively staggered in adjacent valleys.

The advantages of this construction will be apparent from the foregoing description. It will result in an oil-well screen of remarkably adequate strength, much stronger than those heretofore employed, and also will give much greater capacity than the previous oil-well screens, and freedom from clogging. The arrangement of ribs integrally united with the body of the tube and rows of holes from the bottoms of the valleys between said ribs, relatively closely spaced, and yet producing this great strength, is an especial feature of advantage for the oil-well screen embodying my invention. Such an oil-well screen is well able to resist all stresses to which it may be subjected in the process of setting, and when once it has been set in position in the oil-bearing strata it will remain useful and operative until all available supplies of oil have been removed from the strata in the regions properly draining to the oil-well screen.

I claim:

1. An oil-well screen comprising a metallic tube formed outside with a multiplicity of perforated valleys and intervening integral ribs, and an outer metallic layer formed of wire positioned helically on the ribs and welded thereto at every crossing point of ribs and wire, the coils of said wire being everywhere equally spaced to form a continuous drainage slot opening into the valleys.

2. An oil-well screen comprising a metallic tube formed outside with a multiplicity of flat-bottomed valleys and intervening integral ribs, there being rows of holes extending through the bottoms of said valleys to the interior of the tube, and an outer metallic layer formed of wire positioned helically on the rods and welded thereto at every crossing point of ribs and wire, the coils of said wire being everywhere equally spaced to form a continuous drainage slot opening into the valleys.

3. An oil-well screen comprising a metallic tube formed outside with a multiplicity of perforated valleys and intervening integral ribs, said ribs having converging side walls to make them roughly triangular in cross-section, and an outer metallic layer formed of wire positioned helically on the ribs and welded thereto at every crossing point of ribs and wire, the coils of said wire being everywhere equally spaced to form a continuous drainage slot opening into the valleys.

4. An oil-well screen comprising a metallic tube formed outside with a multiplicity of perforated valleys and integral ribs, said ribs having their outer edges everywhere in a common cylindrical plane, and an outer metallic layer formed of wire positioned helically on the ribs and welded thereto at every crossing point of ribs and wire, the coils of said wire being everywhere equally spaced to form drainage slots opening into the valleys.

5. An oil-well screen comprising a metallic tube formed outside with a multiplicity of perforated valleys and intervening integral ribs, said ribs having converging side walls to make them roughly triangular in cross-section and having their outer reduced edges everywhere in a common cylindrical plane, and an outer metallic layer formed of wire positioned helically upon the ribs and welded thereto at every crossing point of ribs and wire, the coils of said wire being everywhere equally spaced to form a continuous drainage slot opening into the valleys.

6. An oil-well screen comprising a metallic tube formed outside with a multiplicity of flat-bottomed valleys and intervening integral ribs all of which have their outer edges in a common cylindrical plane, there being rows of holes extending through the bottoms of said valleys to the interior of the tube, and an outer metallic layer formed of wire positioned helically on the rods and welded thereto at every crossing point of ribs and wire, the coils of said wire being everywhere equally spaced to form a continuous drainage slot opening into the valleys.

7. An oil-well screen comprising a metallic tube formed outside with a multiplicity of flat-bottomed valleys and intervening integral ribs all of which have their outer edges in a common cylindrical plane, there being rows of holes extending through the bottoms of said valleys to the interior of the tube, the holes of adjacent rows being relatively offset or staggered, and an outer layer formed of wire positioned helically on the ribs and welded thereto at every crossing point of ribs and wire, the coils of said wire being everywhere equally spaced to form a continuous drainage slot opening into the valleys.

8. An oil-well screen comprising a metallic tube formed outside with a multiplicity of longitudinally-extended perforated valleys and intervening integral ribs having converging side walls to form reduced outer edges, and an outer metallic layer formed of a wire having converging side walls and a reduced edge positioned in helical coils on the ribs with the reduced edge of all the coils in contact therewith and welded thereto at every crossing point of ribs and wire, said coils everywhere being equally spaced to form a continuous drainage slot opening into the valleys.

9. An oil-well screen comprising a metallic tube formed outside with a multiplicity of longitudinally-extended perforated valleys and intervening integral ribs having converging side walls to form reduced outer edges, all said edges lying in a common cylindrical plane, and an outer metallic layer formed of a wire having converging side walls and reduced edges positioned in helical coils on the ribs with the reduced edge of all of the coils in contact therewith and welded thereto at every crossing point of ribs and wire, said coils everywhere being equally spaced to form a continuous drainage slot opening into the valleys.

10. An oil-well screen comprising a metallic tube formed with a multiplicity of rows of perforations equally spaced apart and relatively staggered in adjacent rows with intervening portions of unperforated tubing between each row of perforations, metallic ribs immovably supported by said unperforated portions and having converging side walls to form reduced outer edges, all said edges lying in a common cylindrical plane whereby valleys are formed between adjacent pairs of ribs each valley communicating to the inside of the tube through a row of said holes, and an outer metallic layer formed of wire positioned helically on the ribs and secured thereto at every crossing point of ribs and wire, the coils of said wire being everywhere equally spaced to form uniform drainage slots opening into the valleys.

EDWARD E. JOHNSON.